Sept. 29, 1925.
P. A. ROSSI
SOIL PULVERIZER
Filed Oct. 8, 1923
1,555,160
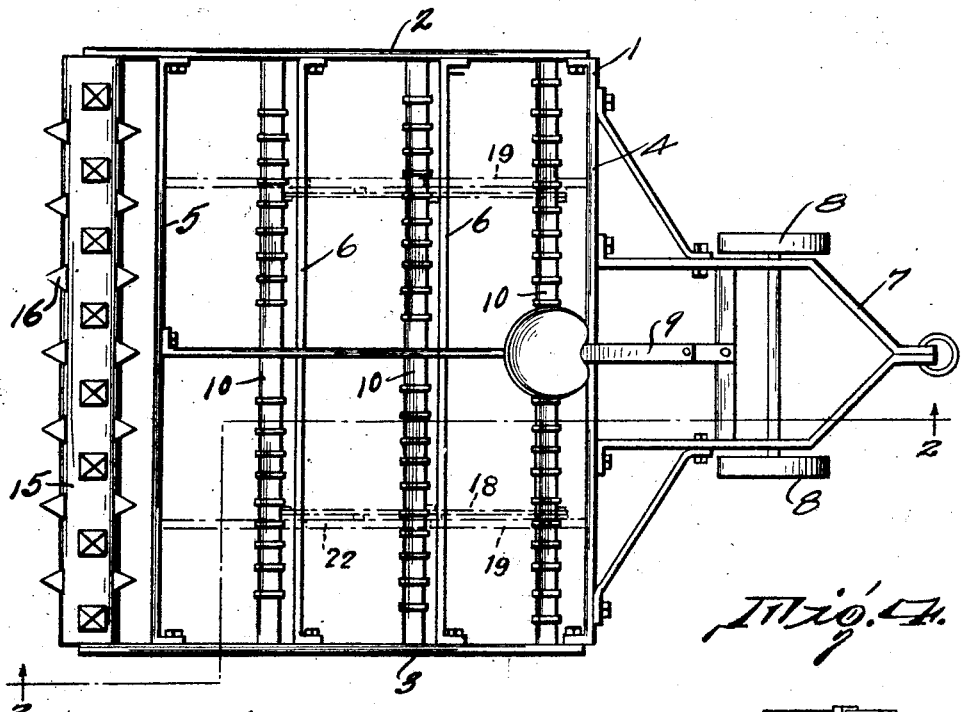
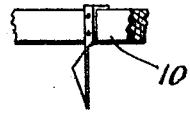
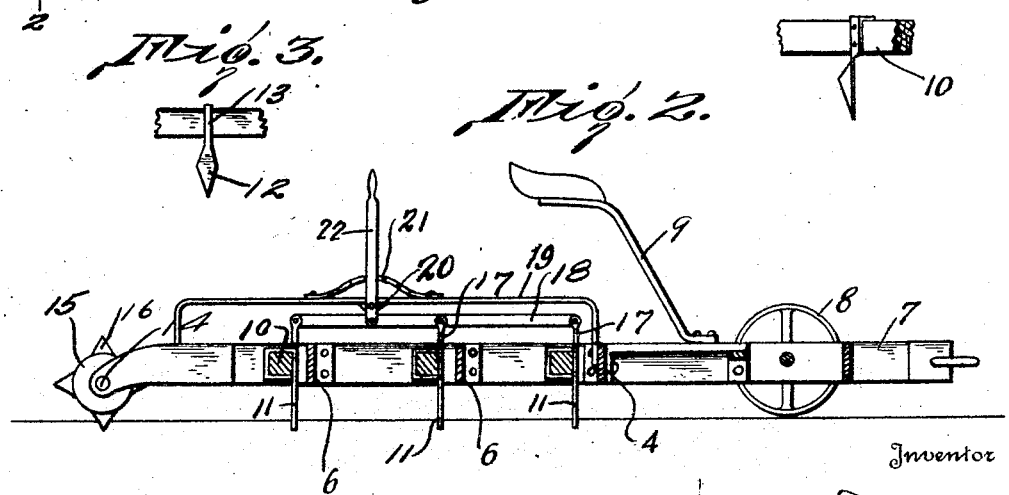
Inventor
Paul A. Rossi Patented Sept. 29, 1925.

1,555,160

UNITED STATES PATENT OFFICE.

PAUL A. ROSSI, OF EAST YOUNGSTOWN, OHIO.

SOIL PULVERIZER.

Application filed October 8, 1923. Serial No. 667,279.

*To all whom it may concern:*

Be it known that I, PAUL A. ROSSI, a citizen of Italy, residing at East Youngstown, in the county of Mahoning and State of Ohio, have invented certain new and useful Improvements in Soil Pulverizers, of which the following is a specification.

This invention relates to soil pulverizers, and the primary object is to provide an implement for breaking up and pulverizing the ground after it has been ploughed.

Another object of the invention is to generally improve and simplify the construction of implements of this character so that they may be inexpensively constructed and readily adapted to withstand the rough usage to which devices of this character are subjected.

Other objects of the invention will appear upon consideration of the following detailed description and accompanying drawings, in which, Figure 1 is a plan view of the implement constructed in accordance with my invention, Figure 2 is a cross section on the line 2—2 of Figure 1, Figure 3 is a detailed view of one of the cultivator blades used in the apparatus, and Figure 4 is a detailed view of another type of blade.

Referring to the drawings by numerals, the main frame 1 comprises the side bars 2 and 3 and the front bar 4 which braces the front ends of the side bars 2. The rear ends of the side bars 2 are attached to the rear frame bar 5, thus effectively bracing the frame structure. These frame bars are further augmented by the brace bars 6 extending longitudinally across the frame and attached to the side bars 2 and 3. The forward frame bar 4 is attached to a carriage frame 7 which is provided with wheels 8 to support the front end of the frame, and this carriage frame 7 is equipped with a driver's seat 9 whereon the operator is seated when the device is in use, and in this connection it will be understood that the apparatus may be either horse-drawn or attached to a tractor.

Extending longitudinally across the frame structure between the side frame bars 2 and 3 are the supporting bars 10 to which are attached the pointed blades 11 which consist of the pointed teeth 12, having a shank 13 fitted around the square supporting bars 10 so that the teeth are held in a rigid position and extend downwardly below the supporting frame 1. A series of these teeth are mounted on each of the supporting bars 10 and are preferably located in staggered relation with respect to each other so that the ground surface is effectively covered by the teeth as the device is in motion.

The rear ends of the side frame bars 2 and 3 are extended beyond the frame bar 5 and their terminals are provided with bearings to receive a shaft 14 which carries a roller 15 equipped with radially projecting teeth or prongs 16 which assist in the pulverizing of the soil as the device is in motion, since it will be obvious that the roller will be turned when the device moves forward so that the prongs 16 will engage and pulverize the lumps of soil with which they come in contact.

Secured to the supporting bars 10 are extension bars 17, which are pivotally connected to the swinging bar 18. A bracket 19 is attached to the frame bars 4 and 5 and carries a pivot plate 20 and lever engaging bar 21. A control lever 22 is pivoted to the plate 21 and swinging bar 18, and movement of said control lever 22 causes the supporting bars 10 to rotate thereby disengaging the blades 11 with the soil.

In operation, it will be obvious that when the device is attached to a tractor or is drawn by horses, the teeth 12 will engage the surface of the ground and act as a harrow in breaking up the large clods of earth, and the pulverizing will be accomplished by the prongs 16 of the roller which travels behind the teeth 12.

Minor changes may be made in the details of construction without departing from the spirit of the invention or the scope of the claim hereunto appended.

What I claim as new and desire to secure by Letters Patent is:

A soil pulverizer of the character described, comprising a rectangular main frame, bars extending across said frame and pivotally mounted thereto, said bars being spaced apart from each other, a series of teeth attached to each of said bars and extending downwardly below the frame to engage the soil, the side bars of said frame being extended rearwardly and downwardly and provided with bearings at their terminals, a roller rotatably mounted in said bearings, brace bars extending transversely of said frame and arranged between said teeth supporting bars for bracing said frame, a supporting carriage located forwardly of said frame, a pair of ground wheels carried by said carriage for supporting the forward end of the frame from the soil, and a series of levers by which the teeth supporting bars are rotated for lifting the teeth free from the soil.

In testimony whereof, I have affixed my signature.

PAUL A. ROSSI.